Patented May 21, 1940

2,201,395

UNITED STATES PATENT OFFICE 2,201,395

MODIFIED POLYMERS OF METHACRYLIC ACID ESTERS AND PREPARATION OF THE SAME

David A. Fletcher, Arlington, N. J., assignor to E. I. du Pont de Nemours & Company, Wilmington, Del., a corporation of Delaware No Drawing. Application January 26, 1938, Serial No. 187,025

7 Claims. (Cl. 260—83.)

This invention relates to modified polymers and the preparation of same and, more particularly, to modified polymerized esters of methacrylic acid having unique and desirable properties.

The polymeric resins of the type herein considered of which polymerized methyl methacrylate is an outstanding example, are recognized as having many exceptional characteristics that make them valuable as the sole or chief ingredients of plastic masses suitable for molding.

An object of the present invention is to provide a modified polymerized methacrylate resin having improved molding characteristics. A more particular object is to provide such a resin which may be injection-molded with greater facility and speed to give a molded article having an improved surface finish and improved form-stability. A further object is to provide such a resin which, at the same time, retains the recognized favorable qualities of the unmodified resins, including their good color, transparency, and resistance to water and chemical influences, and without unduly impairing their desirably high softening temperatures. Other objects of the invention will be apparent from the description given hereinafter.

The above objects are accomplished according to the present invention by polymerizing polymerizable esters of methacrylic acid in admixture with terpineol. Preferably, the amount of terpineol is 3-14 percent by weight of the polymerizable ester and, for producing a molding compound, a mold lubricant is either mixed with the ester before polymerization or is subsequently incorporated in the polymerized ester. If desired conventional plasticizers may be used in conjunction with the terpineol.

The term "terpineol" is used herein to denote either commercial terpineol in which alpha terpineol is the predominating constituent, or alpha terpineol itself; beta and gamma terpineols, which constitute a minor proportion of commercial terpineol, are of comparatively little value in the present invention.

The modified polymerized methacrylate esters of the present invention are formed by the polymerization of the monomeric esters in admixture with terpineol by any of the known methods of polymerization. Specific embodiments of the invention are illustrated in the following examples wherein all parts are given by weight.

Example 1

A mixture "A" is made of—

| | Parts |
|---|---|
| Methyl methacrylate monomer | 900 |
| Terpineol | 80 |
| "C-18 alcohol" | 20 |
| Benzoyl peroxide | 7.2 |

The "C-18 alcohol", which serves as a mold lubricant, is a mixture of alcohols from hydrogenated esters of cocoanut oil, containing alcohols of 16, 17 and, predominantly, 18 carbon atoms.

A mixture "B" is made of—

| | Parts |
|---|---|
| Distilled water | 1950 |
| Disodium acid phosphate | 7.6 |
| Monosodium acid phosphate | 0.4 |
| Polymethacrylic acid | 1.0 |
| Sodium hydroxide | 0.46 |

The mixtures "A" and "B" are combined and agitated rapidly while being heated to a temperature of 80° C. The container is fitted with a reflux. Heating is continued until polymerization is complete, a period of about one hour.

Under the conditions of agitation, and with the assistance of the granulating agent (polymethacrylic acid) contained in the mixture "B", the ingredients of mixture "A" are maintained throughout the reaction in the form of droplets, and the resulting polymer is in the form of tiny beads. The polymer is separated from the aqueous vehicle, washed and dried.

Example 2

A mixture "A" is made of—

| | Parts |
|---|---|
| Methyl methacrylate monomer | 1320 |
| Terpineol | 180 |
| Benzoyl peroxide | 13.2 |

A mixture "B" is made of—

| | Parts |
|---|---|
| Distilled water | 2250 |
| "Gardinol" | 18.75 |

"Gardinol", used as the emulsifying agent, is a commercial preparation of sodium salts of higher fatty sulphate esters.

The mixtures "A" and "B" are combined and passed through a colloid mill, to effect emulsification of the ingredients "A" in the vehicle "B." The emulsion is heated at 75 to 80° C. until polymerization is complete.

The modified polymethyl methacrylate is recovered from the emulsion, and the resin compacted into physical form suitable for injection molding.

Example 3

A mixture is made up of—

| | Parts |
|---|---|
| Methyl methacrylate monomer | 900 |
| Terpineol | 80 |
| "C-12 alcohol" | 20 |
| Benzoyl peroxide | 9 |

The "C-12 alcohol", which serves as a lubricant in the molding operation, is a straight-chain saturated fatty alcohol of 12 carbon atoms, or a mixture of it with adjacent members of the series.

This mixture, which becomes a homogeneous solution upon being heated, is polymerized by being heated in a sturdy mixer fitted with a suitable refluxing condenser.

The polymer is comminuted to suitable granulation for molding.

Example 4

A mixture "A" is made of—

| | Parts |
|---|---|
| Methyl methacrylate monomer | 97 |
| Terpineol | 3 |
| "Lorol" | 2 |
| Benzoyl peroxide | 1 |

"Lorol", used as a mold lubricant, is a commercial preparation of alcohols of high molecular weights.

A mixture "B" is made up of—

| | Parts |
|---|---|
| Distilled water | 200 |
| Disodium acid phosphate | 1 |
| Monosodium acid phosphate | 0.05 |
| Polymethacrylic acid | 0.6 |
| Sodium hydroxide | 0.3 |

Procedure as in Example 1.

Example 5

A mixture "A" is made of—

| | Parts |
|---|---|
| Methyl methacrylate monomer | 900 |
| Alpha terpineol | 30 |
| Dibutyl phthalate | 50 |
| "C-18 alcohol" | 20 |
| Benzoyl peroxide | 7.2 |

A mixture "B" is made of—

| | Parts |
|---|---|
| Distilled water | 1950 |
| Disodium acid phosphate | 7.6 |
| Monosodium acid phosphate | 0.4 |
| Polymethacrylic acid | 1.0 |
| Sodium hydroxide | 0.46 |

The procedure is as in Example 1.

Example 6

A mixture "A" is made of—

| | Parts |
|---|---|
| Methyl methacrylate monomer | 970 |
| Terpineol | 30 |
| Diethyl phthalate | 70 |
| "C-12 alcohol" | 10 |

A mixture "B" is made of—

| | Parts |
|---|---|
| Distilled water | 3200 |
| Disodium acid phosphate | 18 |
| Monosodium acid phosphate | 1 |
| Polymethacrylic acid | 11 |

Procedure as in Example 1.

Example 7

A mixture "A" is made of—

| | Parts |
|---|---|
| Methyl methacrylate monomer | 895 |
| Terpineol | 100 |
| Ethyl palmitate | 5 |
| Benzoyl peroxide | 10 |

A mixture "B" is made of—

| | Parts |
|---|---|
| Distilled water | 2000 |
| "Duponol ME" | 11 |

"Duponol ME," used as an emulsifying agent, is a commercial preparation of sulphated fatty alcohols.

Procedure as in Example 2.

Example 8

A mixture of—

| | Parts |
|---|---|
| Methyl methacrylate monomer | 880 |
| Terpineol | 90 |
| Ethyl palmitate | 30 |
| Benzoyl peroxide | 7 | is polymerized as in Example 3.

It will be understood that the above examples are merely illustrative and that the present invention broadly comprises polymerizing a polymerizable ester of methacrylic acid in admixture with terpineol Since the chief use of the modified polymer formed is in molding operations, the polymerization will normally be carried out in some manner which will give a finely divided product, as the examples illustrate. Obviously, polymerization to obtain a modified polymer in massive form is not excluded, although such procedure would involve comminuting the massive polymer to get a molding compound, and hence, would not appear to be an economical method of operating under usual circumstances.

While the use of a proportion of terpineol outside the range of 3–14 percent by weight of the polymerized ester is not excluded, it has been found practical to keep within that range to obtain a modified polymer having optimum molding properties. The terpineol should be free from objectionable impurities, particularly, free from iron contamination. Also during and subsequent to manufacture, the ingredients and product should not be permitted to come in contact with iron while moist.

Ordinarily no appreciable advantage is gained by employing with the terpineol and mold lubricant other modifying agents such as conventional plasticisers. However, such combinations do come within the scope of the present invention as illustrated in Examples 5 and 6 where dibutyl phthalate and diethyl phthalate, respectively, are used.

Ordinarily it is desirable to include a mold lubricant, a comparatively minor proportion of which serves the useful purpose of reducing any tendency of the mixture to adhere to the metal of the molds. These mold lubricants are generally used in the proportion of 0.5–4.0 percent by weight of the polymerizable esters, preferably in a proportion of about 2 percent. Among the conventional mold lubricants satisfactory for use in the present invention may be mentioned fatty alcohols of from about twelve to about eighteen carbon atoms, such as the "C-12" and "C-18" alcohols and the "Lorol" used in the examples, and also higher alkyl esters such as ethyl palmitate, ethyl oleate, and ethyl stearate. Other mold lubricants suitable for the purpose will occur to those skilled in the art.

While the upper operative limits of proportions of terpineol and lubricant have been designated as being preferably 14 and 4 percent, respectively, by weight of the polymerized ester of methacrylic acid, it is generally preferable that the total of the two (or where conventional plasticizer also is used, the total of the three) be kept below about 14 percent of the polymerized ester. Coloring ingredients, either soluble dye or insoluble coloring matter, may be used in known manner.

Any additions of mold lubricants, or conventional plasticisers or dyestuffs may be made either before or after the polymerization as may be convenient. But it is essential that the terpineol be admixed with the methacrylic acid ester prior to polymerization. Separate polymerization of the ester and subsequent incorporation of the terpineol will not accomplish the beneficial results obtained by the present invention.

Benzoyl peroxide is shown as the polymerization catalyst in the examples, although other polymerization catalysts may be used in accordance with the ordinary practice in the art.

Also, the examples show the use of monomeric ester as the starting material but it is feasible to use a syrup comprising a solution of a small proportion of polymer in monomer.

Methyl methacrylate is the outstanding member of the group of esters to which the invention is applicable. Other polymerizable esters of methacrylic acid particularly suitable for use in the present invention include isopropyl methacrylate, phenyl methacrylate, cyclohexyl methacrylate, para-cyclohexyl phenyl methacrylate. Interpolymers of these esters may likewise be used in the present invention.

The modified polymers of the present invention offer very definite and important advantages over both unplasticized and conventionally plasticized polymers for use in injection molding. As compared with unplasticized polymers, these modified polymers have no advantage in molding cycle nor in form-stability but they may be injection molded at more moderate temperatures and their superiority in gloss and finish of the molded article is very pronounced.

As compared with conventionally plasticized polymers of comparable softening temperature, the modified polymers can be satisfactorily injection-molded in a shorter cycle at a given temperature, an important economic factor, and they give articles of superior gloss and finish, and of marked superiority in form-stability as measured by a shrinkage test consisting of holding the molded articles at an elevated temperature (usually 50° C. or 70° C.) for 24 hours or more.

As many apparently widely different embodiments of this invention may be made without departing from the spirit and scope thereof, it is to be understood that the invention is not limited to the specific embodiments thereof except as defined in the appended claims.

I claim:

1. Process of preparing a modified polymer of a polymerizable ester of methacrylic acid, which comprises mixing said ester in substantially monomeric form with 3–14 percent, by weight of said ester, of alpha terpineol and subjecting the mixture to polymerizing conditions until said ester is substantially completely polymerized.

2. Process of preparing a modified polymer of a polymerizable ester of methacrylic acid, which comprises mixing said ester in substantially monomeric form with 3–14 percent, by weight of said ester, of alpha terpineol and 0.5–4.0 percent, by weight of said ester, of a mold lubricant and subjecting the mixture to polymerizing conditions until said ester is substantially completely polymerized.

3. Process of preparing a modified polymer of a polymerizable ester of methacrylic acid, which comprises mixing said ester in substantially monomeric form with 3–14 percent, by weight of said ester, of alpha terpineol, subjecting the mixture to polymerizing conditions until said ester is substantially completely polymerized, and then incorporating with said modified polymer 0.5–4.0 percent, by weight of said modified polymer, of a mold lubricant.

4. Process of preparing a modified polymer of methyl methacrylate, which comprises mixing methyl methacrylate in substantially monomeric form with 3–14 percent, by weight of said methyl methacrylate, of alpha terpineol and subjecting the mixture to polymerizing conditions until said methyl methacrylate is substantially completely polymerized.

5. Process of preparing a modified polymer of methyl methacrylate, which comprises mixing said methyl methacrylate in substantially monomeric form with 3–14 percent, by weight of said methyl methacrylate, of alpha terpineol and 0.5–4.0 percent, by weight of said methyl methacrylate, of a mold lubricant and subjecting the mixture to polymerizing conditions until said methyl methacrylate is substantially completely polymerized.

6. A composition comprising a polymerized ester of methacrylic acid which has been polymerized in admixture with 4–14 percent, by weight of said ester, of alpha terpineol.

7. A molding composition comprising a polymerized ester of methacrylic acid which has been polymerized in admixture with 4–14 percent, by weight of said ester, of alpha terpineol, and 0.5 to 4.0 percent, by weight of said ester, of a mold lubricant.

DAVID A. FLETCHER.